United States Patent
Peng et al.

(10) Patent No.: US 11,476,699 B2
(45) Date of Patent: Oct. 18, 2022

(54) POWER BACKUP CIRCUIT AND METHOD OF OPERATING THE SAME

(71) Applicant: DELTA ELECTRONICS, INC., Taoyuan (TW)

(72) Inventors: Te-Chih Peng, Taoyuan (TW);
Ming-Hsiang Lo, Taoyuan (TW);
Chih-Hong Wu, Taoyuan (TW);
Yu-Ren Weng, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/988,233

(22) Filed: Aug. 7, 2020

(65) Prior Publication Data

US 2021/0336474 A1    Oct. 28, 2021

(30) Foreign Application Priority Data

Apr. 27, 2020 (CN) .......................... 202010343962.2

(51) Int. Cl.
*H02J 9/00* (2006.01)
*H02J 9/06* (2006.01)
*H02J 9/04* (2006.01)

(52) U.S. Cl.
CPC ................ *H02J 9/061* (2013.01); *H02J 9/04* (2013.01); *H02J 9/062* (2013.01)

(58) Field of Classification Search
CPC ...... H02J 9/061; H02J 1/10; H02J 9/04; H02J 9/06; H02J 9/062; H02J 9/068
See application file for complete search history.

(56) References Cited

U.S. PATENT DOCUMENTS

| | | | |
|---|---|---|---|
| 2007/0018506 A1* | 1/2007 | Paik | H02J 9/06 307/115 |
| 2013/0106190 A1* | 5/2013 | Lin | H02J 9/061 307/64 |
| 2014/0077602 A1* | 3/2014 | Liu | H02J 1/102 307/64 |
| 2015/0109708 A1 | 4/2015 | Cheng | |
| 2015/0123473 A1* | 5/2015 | Braylovskiy | H02J 1/102 307/64 |
| 2015/0280410 A1* | 10/2015 | Elberbaum | G05B 15/02 361/679.01 |
| 2020/0014239 A1* | 1/2020 | Liu | H02J 1/10 |

\* cited by examiner

*Primary Examiner* — Rexford N Barnie
*Assistant Examiner* — Rasem Mourad
(74) *Attorney, Agent, or Firm* — Muncy, Geissler, Olds & Lowe, P.C.

(57) ABSTRACT

A power backup circuit provides a plurality of input power sources to back up a load. The power backup circuit includes a first switch, a second switch, and a control unit. The input power sources at least includes a first input power source and a second input power source. If the input power source of the load needs to be changed from the first input power source to the second input power source, the control unit controls the first switch to be coupled to the second input power source and controls the second switch to be coupled to the second input power source after the control unit effects a supply current flowing through a first power supply path and a second power supply path both coupled to the first input power source and the load to be reduced below a current threshold.

16 Claims, 7 Drawing Sheets

POWER BACKUP CIRCUIT AND METHOD OF OPERATING THE SAME

BACKGROUND

Technical Field

The present disclosure relates to a power backup circuit and a method of operating the same to reduce a current flowing through the circuit before switching an input power source of the circuit from a first power source to a backup power source.

Description of Related Art

The statements in this section merely provide background information related to the present disclosure and do not necessarily constitute prior art.

Nowadays, the application of data center has become more and more extensive, and it is necessary to maintain the operation stability and improve the reliability of the data center, therefore, data centers usually adopt power backup circuits to maintain its continuous operation. However, the current power supply backup system is not only with large size but also with high cost, which fails to meets the high power density requirement in power supply design.

SUMMARY

A power backup circuit provides a plurality of input power sources to back up a load. The input power sources at least include a first input power source and a second input power source. The power backup circuit includes a first switch, a second switch, and a control unit. The first switch includes a plurality of first ends and a second end; the first ends are respectively coupled to first nodes of the input power sources, the second end is coupled to one end of the load, and a first power supply path is formed by coupling the first end to the second end. The second switch includes a plurality of third ends and a fourth end; the third ends are respectively coupled to second nodes of the input power sources, the fourth end is coupled to the other end of the load, and a second power supply path is formed by coupling the third end coupled to the fourth end. The control unit is coupled to the first switch and the second switch. If the input power source of the load is determined to be changed from the first input power source to the second input power source, the control unit effects a supply current flowing through the first power supply path and the second power supply path to be reduced below a current threshold, and then the control unit controls the second end of the first switch to be coupled to the first end corresponding to the second input power source and controls the fourth end of the second switch to be coupled to the third end corresponding to the second input power source.

A method of operating a power backup circuit for providing a plurality of input power sources having at least a first input power source and a second input power source to back up a load is disclosed. The method includes steps of: controlling one of a plurality of first ends of a first switch to be coupled to one end of the first input power source so that a first power supply path is formed by the first end and a second end of the first switch for supplying power to one end of the load, controlling one of a plurality of third ends of a second switch to be coupled to the other end of the first input power source so that a second power supply path is formed by the third end and a fourth end of the second switch for supplying power to the other end of the load, controlling a supply current flowing through the first power supply path and the second power supply path to be reduced below a current threshold if the input power source of the load is determined to be changed from the first input power source to the second input power source, controlling the second end of the first switch to be coupled to a first end corresponding to the second input power source, and controlling the fourth end of the second switch to be coupled to a third end corresponding to the second input power source.

Accordingly, the main object and effect of the present disclosure is to provide the power backup circuit to first reduce a current flowing through the power backup circuit before changing the input power sources so as to increase power density and working efficiency.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
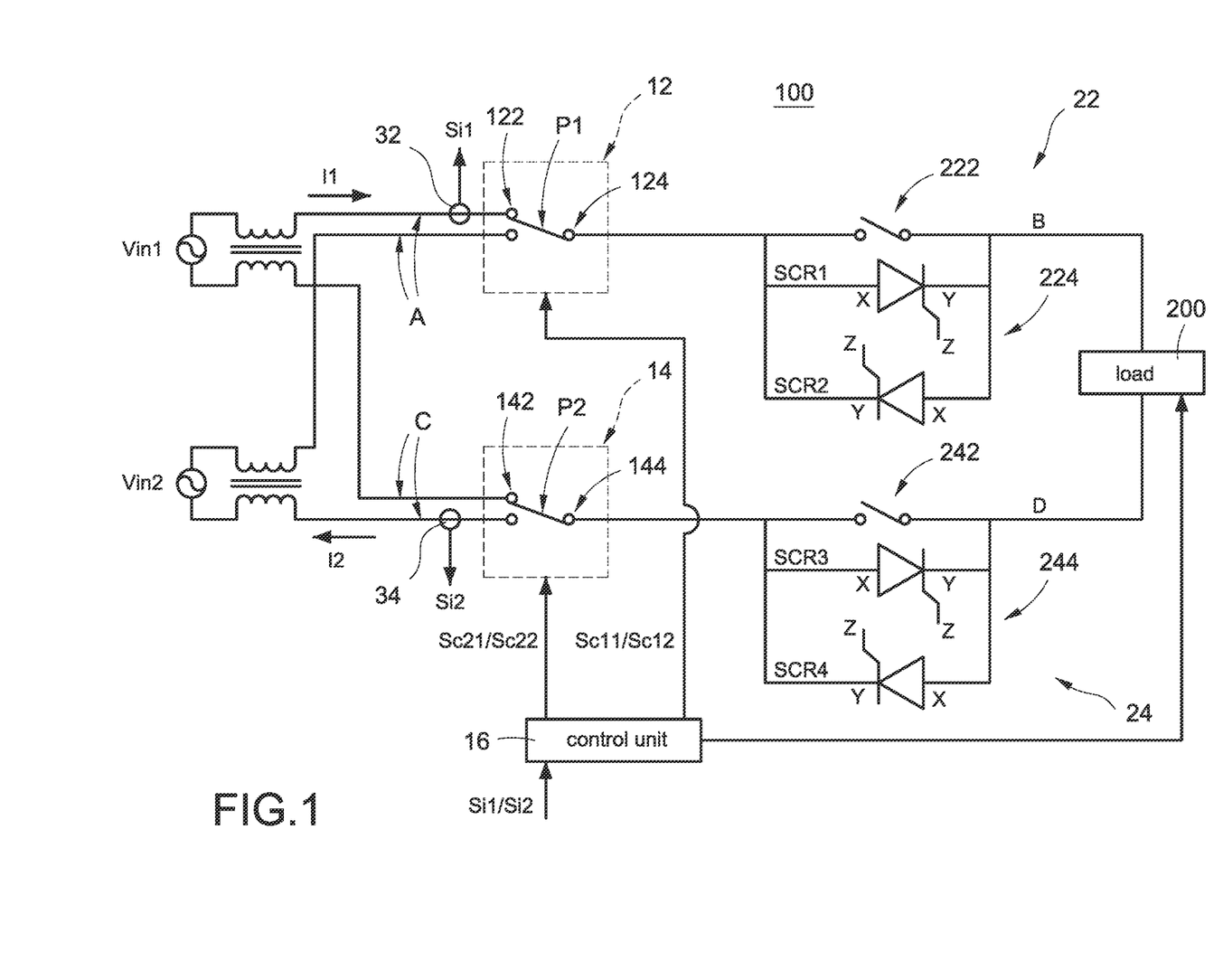
FIG. 1 is a block diagram of a power backup circuit according to a first embodiment of the present disclosure.

Please refer to FIG. 1, the power backup circuit 100 is coupled between a plurality of input power sources Vin1 and Vin2 and a load 200, and the input power sources Vin1 and Vin2 are used to back up each other to continuously supply power to the load 200. When one of the input power sources Vin1 and Vin2, which is coupled to the load 200, is abnormal, assuming that the input power source Vin1 is abnormal, the input power source Vin2 replaces the input power source Vin1 as a back power, that is, the input power source Vin2 is switched to be coupled to the load 200. In one embodiment, the input power sources Vin1 and Vin2 are AC power sources for supplying AC power to the load 200. The power backup circuit 100 includes a first switch 12, a second switch 14, and a control unit 16. The control unit 16 is coupled to the first switch 12 and the second switch 14, and provides first control signals Sc11, Sc12 to control switching of the first switch 12 and provides second controls signals Sc21, Sc22 to control switching of the second switch 14.

Hereinafter, take the input power source Vin1 being coupled to the load 200 as an example in this embodiment.

The first switch 12 includes a plurality of first ends 122 and a second end 124. The first ends 122 are respectively coupled to ends A of the input power sources Vin1 and Vin2 (i.e., the ends A are live wire ends of the input power sources Vin1 and Vin2), and the second end 124 of the first switch 12 is coupled to an end B of the load 200 (i.e., the end B is a live wire end of the load 200). A first power supply path P1 is formed by a connection between the first end 122 and the second end 124. The second switch 14 includes a plurality of third ends 142 and a fourth end 144. The third ends 142 are respectively coupled to ends C of the input power sources Vin1 and Vin2 (i.e., the ends C are neutral wire ends of the input power sources Vin1 and Vin2), and the fourth end 144 of the second switch 14 is coupled to an end D of the load 200 (i.e., the end D is a neutral wire end of the load 200). A second power supply path P2 is formed by a connection between the third end 142 and the fourth end 144. Therefore, the input power source Vin1 can supply power to the load 200 through a loop formed by the first power supply path P1 and the second power supply path P2. Accordingly, only one input power source Vin1 or Vin2 is coupled to the load 200 and supplies power to the load 200 at a time, and the other uncoupled input power source Vin2 or Vin1 provides backup function.

The power backup circuit 100 further includes a first bypass unit 22 and a second bypass unit 24. The first bypass unit 22 is coupled between the first switch 12 and the load 200, and the second bypass unit 24 is coupled between the second switch 14 and the load 200. More specifically, the first bypass unit 22 includes a first bypass switch 222 and a first current limit unit 224, and the second bypass unit 24 includes a second bypass switch 242 and a second current limit unit 244. The first bypass switch 222 is coupled to the second end 124 of the first switch 12 and an end B of the load 200, and the first current limit unit 224 is coupled in parallel to the first bypass switch 222. The second bypass switch 242 is coupled to the fourth end 144 of the second switch 14 and an end D of the load 200, and the second current limit unit 244 is coupled in parallel to the second bypass switch 242.

The first current limit unit 224 includes a first silicon-controlled rectifier SCR1 and a second silicon-controlled rectifier SCR2, and the second current limit unit 244 includes a third silicon-controlled rectifier SCR3 and a fourth silicon-controlled rectifier SCR4. The first silicon-controlled rectifier SCR1 has an anode X, a cathode Y, and a control end Z. The anode X is coupled to the second end 124 of the first switch 12, and the cathode Y is coupled to the end B of the load 200. The second silicon-controlled rectifier SCR2 has an anode X, a cathode Y, and a control end Z. The anode X of the second silicon-controlled rectifier SCR2 is coupled to the cathode Y of the first silicon-controlled rectifier SCR1, and the cathode Y of the second silicon-controlled rectifier SCR2 is coupled to the anode X of the first silicon-controlled rectifier SCR1. The control end Z of the first silicon-controlled rectifier SCR1 is provided to control a current flowing through the first silicon-controlled rectifier SCR1, and the control end Z of the second silicon-controlled rectifier SCR2 is provided to control a current flowing through the second silicon-controlled rectifier SCR2, thereby implementing the effect of limiting current. Since the current flowing through the first silicon-controlled rectifier SCR1 and the current flowing through the second silicon-controlled rectifier SCR2 are controlled by a voltage magnitude of the control end Z thereof, the coupling positions of the control ends Z are not limited. For example but not limited to, the control ends Z may be coupled to the input power sources Vin1 and Vin2, the control unit 16, or external power sources to receive suitable voltage for limiting current. The coupling relationship and control manner of the third silicon-controlled rectifier SCR3 and the fourth silicon-controlled rectifier SCR4 are similar to those of the first silicon-controlled rectifier SCR1 and the second silicon-controlled rectifier SCR2.

At the moment when the first power supply path P1 and the second power supply path P2 are formed by the first switch 12 and the second switch 14, a surge current with an instantaneous excessive value is easy to occur since an operation voltage of the load 200 may not be established, or the operation voltage of the load 200 may not be stable yet. This surge current may accelerate the aging of the first switch 12 and the second switch 14, or cause damage to the load 200. Therefore, at the moment when the first power supply path P1 and the second power supply path P2 are formed by the first switch 12 and the second switch 14, the first current limit unit 224 and the second current limit unit 244 are provided to limit the currents flowing through the first power supply path P1 and the second power supply path P2, respectively, thereby protecting the first switch 12, the second switch 14, and the load 200. After the absence of the surge current, the first bypass switch 222 and the second bypass switch 242 are turned on to bypass the first current limit unit 224 and the second current limit unit 244 so as to prevent the first current limit unit 224 and the second current limit unit 244 from continuously consuming power to save the power consumption of the power backup circuit 100.

The power backup circuit 100 further includes current sensors 32,34, and the current sensors 32,34 are preferably disposed in dislocation. That is, the current sensor 32 is coupled to the live wire end of the input power source Vin1 and the current sensor 34 is coupled to the neutral wire end of the input power source Vin2, or the current sensor 32 is coupled to the neutral wire end of the input power source Vin1 and the current sensor 34 is coupled to the live wire end of the input power source Vin2. Therefore, current signals Si1,Si2 are provided to the control unit 16 according to an input current I1 sensed by the current sensor 32 and an input current I2 sensed by the current sensor 34 so that the control unit 16 determines whether a switching action of the first switch 12 and the second switch 14 is correct (i.e., whether the first switch 12 and the second switch 14 operate normally) according to the current signals Si1,Si2. Specifically, the control unit 16 uses the current sensors 32,34 to provide an error detection mechanism when the first switch 12 and the second switch 14 are switched. By sensing the current before and after the first switch 12 and the second switch 14 are switched every time, it is to determine whether the switches 12,14 normally operate so as to avoid the risk of damage to the power backup circuit 100 or the load 200 caused by incorrect switching actions or switch damage. The current sensors 32,34 can also be used to sense the power backup circuit 100 with dual input power sources, which is common-source or common-neutral point.

Figure 2A:
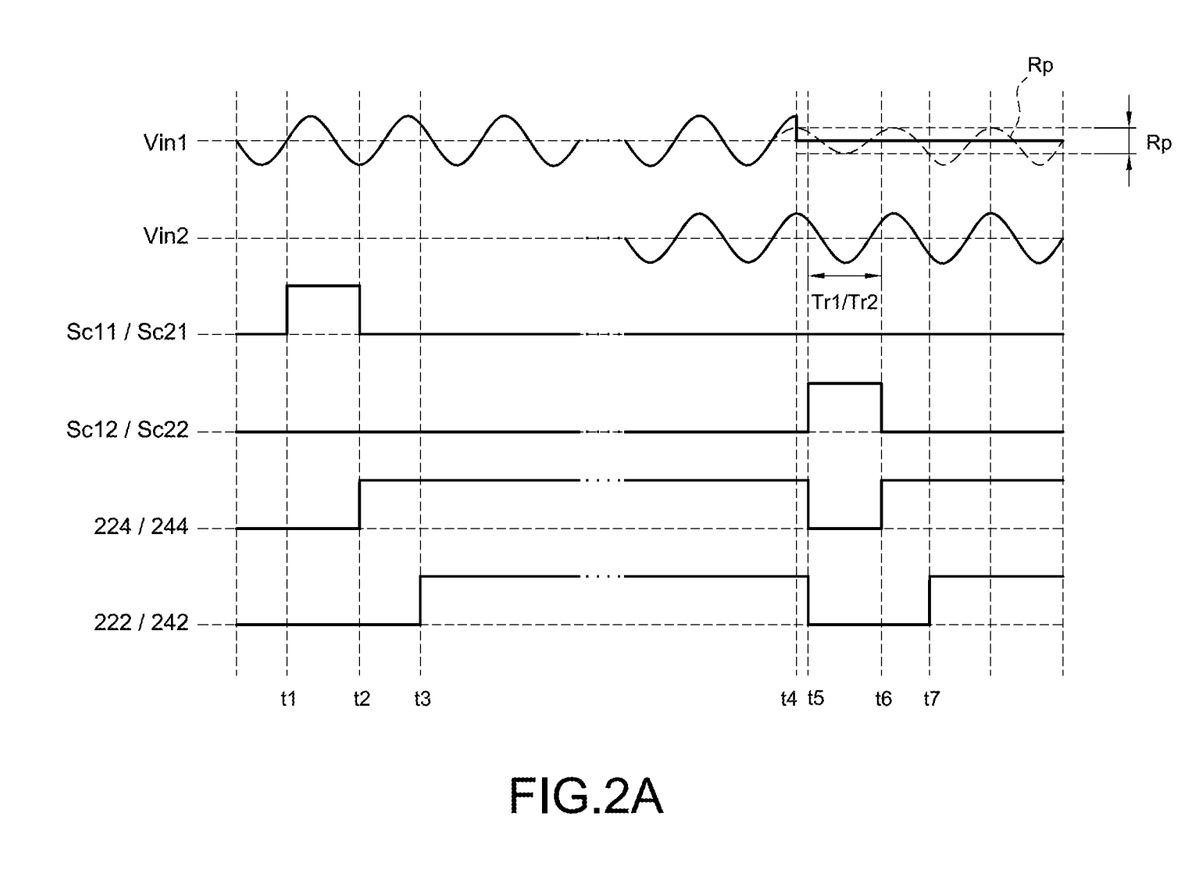
FIG. 2A is a schematic waveform of the first embodiment of the power backup circuit, and a first switch and a second switch thereof are magnetic latching relays according to the present disclosure.

Please refer to FIG. 2A, which shows a schematic waveform of the first embodiment, wherein a first switch and a second switch thereof are magnetic latching relays according to the present disclosure, and also refer to FIG. 1. The characteristic of the magnetic latching relay is that it only needs to be triggered by a pulse signal of a certain width to complete the switching process. For example, once the magnetic latching relay receives a control signal with a high level to be turned on, the relay can be continuously attracted by the magnetic force. At this condition, the control signal can be switched to a low level, and the magnetic latching relay can be kept on without continuously providing the control signal with the high level, that is, the control signal is a pulse, and therefore the power consumption of the power backup circuit 100 can be saved.

When the control unit 16 detects that the input power source Vin1 is available and the control unit 16 wants to control the first switch 12 and the second switch 14 to be turned on to couple the input power source Vin1 to the load 200, the control unit 16 provides a first control signal Sc11 with a high level to the first switch 12 so that the first end 122 corresponding to the end A of the input power source Vin1 is coupled to the second end 124, thereby establishing the first power supply path P1 (at a time point t1). Simultaneously, the control unit 16 also provides a second control signal Sc21 with a high level to the second switch 14 so that the third end 142 corresponding to the end C of the input power source Vin1 is coupled to the fourth end 144, thereby establishing the second power supply path P2 (at the time point t1).

When the first power supply path P1 of the input power source Vin1 is established by the first switch 12 and the second power supply path P2 of the input power source Vin1 is established by the second switch 14, the first end 122 of the first switch 12 and the third end 142 of the second switch 14 can be continuously attracted by the magnetic force, and therefore the first control signal Sc11 and the second control signal Sc21 switch to low level (at a time point t2). At this condition, the first current limit unit 224 is turned on to limit the current flowing through the first power supply path P1 (at the time point t2), and the second current limit unit 244 is also turned on to limit the current flowing through the second power supply path P2 (at the time point t2). After the absence of the surge current, the first bypass switch 222 and the second bypass switch 242 are turned on (at a time point t3) to bypass the first current limit unit 224 and the second current limit unit 244 so as to prevent the first current limit unit 224 and the second current limit unit 244 from continuously consuming power to save the power consumption of the power backup circuit 100.

When the control unit 16 detects that the input power source Vin1 is interrupted or a voltage magnitude of the input power source Vin1 is less than a predetermined range Rp (indicated by dotted lines), or the input power sources transferring is required due to power allocation or scheduling (at a time point t4), an operation sequence of disconnecting the power backup circuit 100 from the input power source Vin1 is described as follows. The control unit 16 first effects a supply current flowing through the first power supply path P1 and the second power supply path P2 to be reduced below a current threshold. The current threshold is predefined according to a current value when the Load 200 is at no load, and the current threshold is approximately equal to zero as the preferred threshold. The control unit 16 may include various manners to reduce the supply current to less than or equal to the current threshold. For example but not limited to, the control unit 16 can provide a signal to the load 200 to cause the load 200 to reduce its self-loading to no load, or the control unit 16 limits a value of the supply current by an external current limit unit.

After the supply current flowing through the first power supply path P1 and the second power supply path P2 is reduced below the current threshold, the control unit 16 controls the first power supply path P1 and the second power supply path P2 to be disconnected (at a time point t5). That is, when the control unit 16 controls the first switch 12 to switch (transfer) from the first end 122 corresponding to the input power source Vin1 to the first end 122 corresponding to the input power source Vin2, the first power supply path P1 coupled between the input power source Vin1 and the load 200 is disconnected (the same for the second switch 14). Since the value of the current flowing through the first power supply path P1 and the second power supply path P2 is very small (even zero), compared with the conventional switching in the state where the load 200 is still loading, the switching process will not suffer too much current stress and no arc will be generated when switching. Accordingly, the power backup circuit 100 of the present disclosure can achieve the effect of safe backup at low current. Afterward, when the first power supply path P1 and the second power supply path P2 are disconnected, the first current limit unit 224 and the first bypass switch 222 are simultaneously turned off (at the time point t5), and the second current limit unit 244 and the second bypass switch 242 are also simultaneously turned off (at the time point t5). Therefore, the coupling relationship between the load 200 and the input power source Vin1 can be completely disconnected.

When the control unit 16 disconnects the first power supply path P1 and the second power supply path P2 of the input power source Vin1 (at the time point t5), a sequence of connecting the power backup circuit 100 to the input power source Vin2 is also performed and described as below. The control unit 16 provides the first control signal Sc12 with a high level to the first switch 12 so that the control unit 16 controls the first switch 12 to switch (transfer) from the first end 122 corresponding to the input power source Vin1 to the first end 122 corresponding to the input power source Vin2 (at the time point t5) to establish a first power supply path P1 between the input power source Vin2 and the load 200. The control unit 16 also provides the second control signal Sc22 with a high level to the second switch 14 so that the control unit 16 controls the second switch 14 to switch (transfer) from the third end 142 corresponding to the input power source Vin1 to the third end 142 corresponding to the input power source Vin2 (at the time point t5) to establish a second power supply path P2 between the input power source Vin2 and the load 200.

When the first power supply path P1 of the second power source Vin2 is established by the first switch 12 and the second power supply path P2 of the second power source Vin2 is established by the second switch 14, the first end 122 of the first switch 12 and the third end 142 of the second switch 14 can be continuously attracted by the magnetic force, and therefore the first control signal Sc12 and the second control signal Sc22 switch to low level (at a time point t6). At this condition, the first current limit unit 224 is turned on to limit the current flowing through the first power supply path P1 (at the time point t6), and the second current limit unit 244 is also turned on to limit the current flowing through the second power supply path P2 (at the time point t6). After the absence of the surge current, the first bypass switch 222 and the second bypass switch 242 are turned on (at a time point t7) to bypass the first current limit unit 224 and the second current limit unit 244 so as to prevent the first current limit unit 224 and the second current limit unit 244 from continuously consuming power to save the power consumption of the power backup circuit 100. Finally, when the first bypass switch 222 and the second bypass switch 242 are turned on, the control unit 16 removes the limitation that the supply current is less than the current threshold so that the load 20 starts to load.

In particular, a first switching time period Tr1 is defined between a time point (at the time point t5) that the first end 122 corresponding to the input power source Vin1 is disconnected from the second end 124 and a time point (at the time point t6) that the first end 122 corresponding to the input power source Vin2 is connected to the second end 124. Also, a second switching time period Tr2 is defined between a time point (at the time point t5) that the third end 142 corresponding to the input power source Vin1 is disconnected from the fourth end 144 and a time point (at the time point t6) that the third end 142 corresponding to the input power source Vin2 is connected to the fourth end 144. Since the switching operations of the first switch 12 and the second switch 14 are performed when the supply current is less than the current threshold with an extremely small value, the first switch 12 and the second switch 14 are switched without high current stress. Therefore, the first switch 12 and the second switch 14 are simultaneously switched to cause the input power source Vin1 to be removed (disconnected) and the input power source Vin2 to be introduced (connected) so that the first switching time period Tr1 and the second switching time period Tr2 can be limited to approximately equal to a mechanical delay time of switching the first switch 12 and the second switch 14. In one embodiment, the high level and low level of the control signals can be interchanged so that the control manner is just the opposite.

Figure 2B:
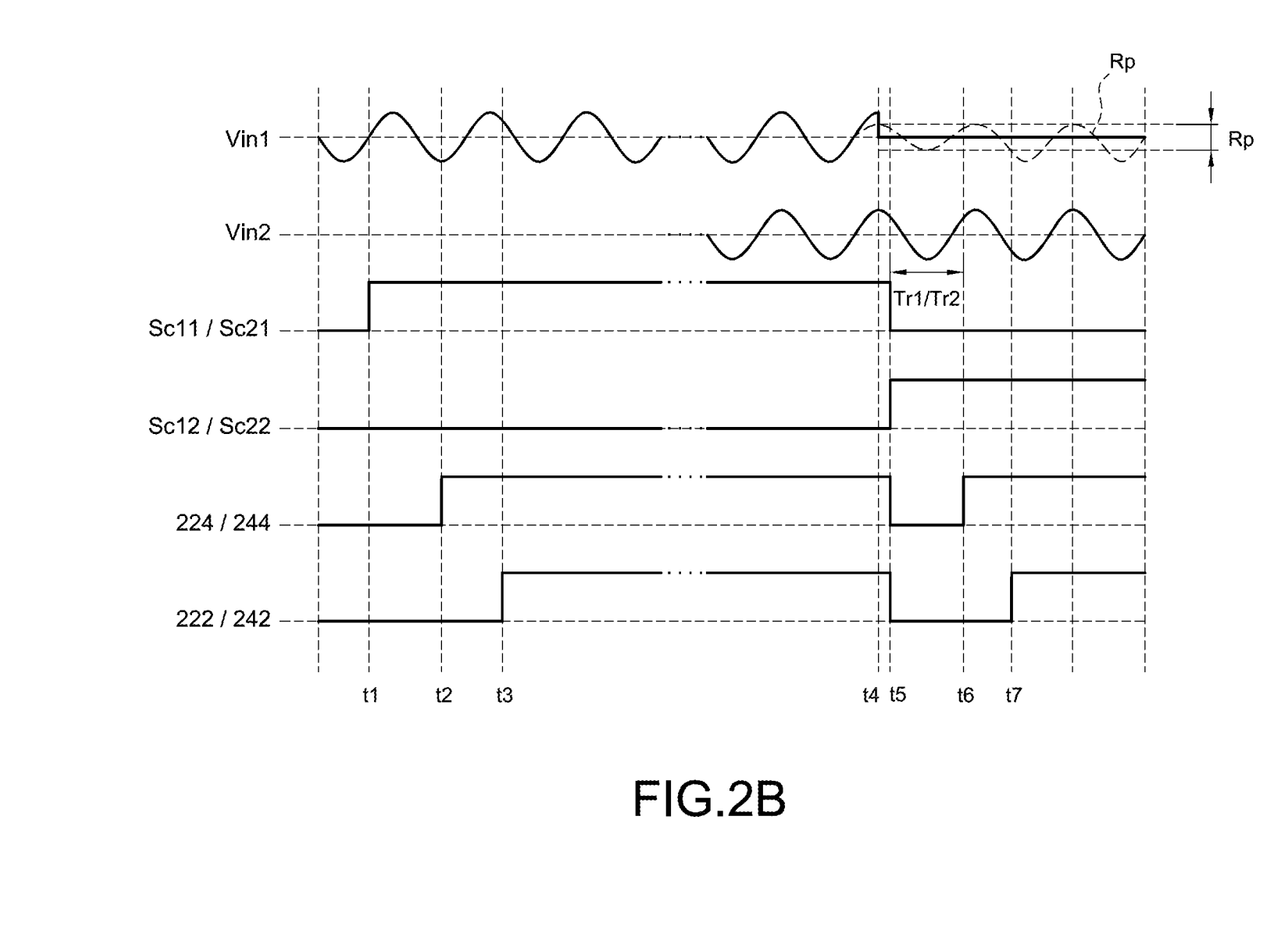
FIG. 2B is a schematic waveform of the first embodiment of the power backup circuit, and the first switch and the second switch thereof are not magnetic latching relays according to the present disclosure.

Please refer to FIG. 2B, which shows a schematic waveform of the first embodiment of the power backup circuit, wherein the first switch and the second switch thereof are not magnetic latching relays according to the present disclosure, and also refer to FIG. 1 to FIG. 2A. Since the first switch 12 and the second switch 14 are not magnetic latching relays, the control unit 16 must continuously provide the first control signal Sc11 with the high level to establish the first power supply path P1 of the input power source Vin1, and also continuously provide the second control signal Sc21 with the high level to establish the second power supply path P2 of the input power source Vin. When the control unit 16 detects that the input power source Vin1 is interrupted or the voltage magnitude of the input power source Vin1 is less than the predetermined range Rp (indicated by dotted lines), or the input power sources transferring is required due to power allocation or scheduling (at a time point t4), the control unit 16 first effects the supply current flowing through the first power supply path P1 and the second power supply path P2 to be reduced below the current threshold. Afterward, the control unit 16 controls the first control signal Sc11 and the second control signal Sc21 to switch to low level, and also controls the first control signal Sc12 and the second control signal Sc22 to switch to high level (at the time point t5), thereby establishing the first power supply path P1 and the second power supply path P2 of the input power source Vin2. In particular, the control manners not mentioned in FIG. 2B are the same as those in FIG. 2A.

Figure 3:
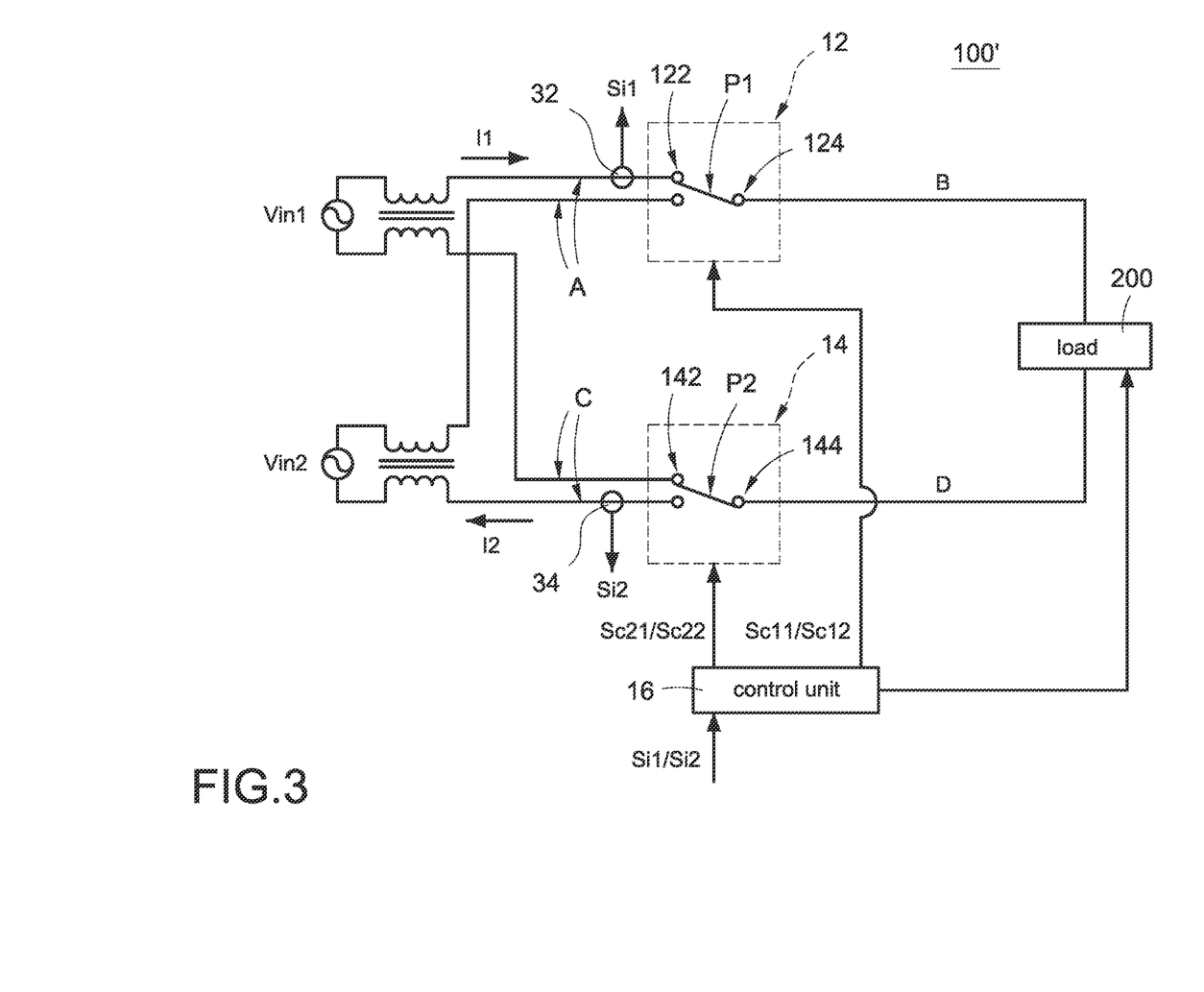
FIG. 3 is a block diagram of the power backup circuit according to a second embodiment of the present disclosure.

Please refer to FIG. 3, which shows a block diagram of the power backup circuit according to a second embodiment of the present disclosure, and also refer to FIG. 1 to FIG. 2B. The difference between the power backup circuit 100' shown in FIG. 3 and the power backup circuit 100 shown in FIG. 1 is that the power backup circuit 100' does not include the first bypass unit 22 and the second bypass unit 24. The second end 124 of the first switch 12 is directly coupled to the end B of the load 200, and the fourth end 144 of the second switch 14 is directly coupled to the end D of the load 200. More specifically, the absence of the first bypass unit 22 and the second bypass unit 24 shown in FIG. 1 is to achieve the effect of further saving the power consumption of the power backup circuit 100' and further improving the efficiency of the power backup circuit 100'. In particular, the components and the coupling relationship of the components not mentioned in FIG. 3 are the same as those in FIG. 1.

Figure 4A:
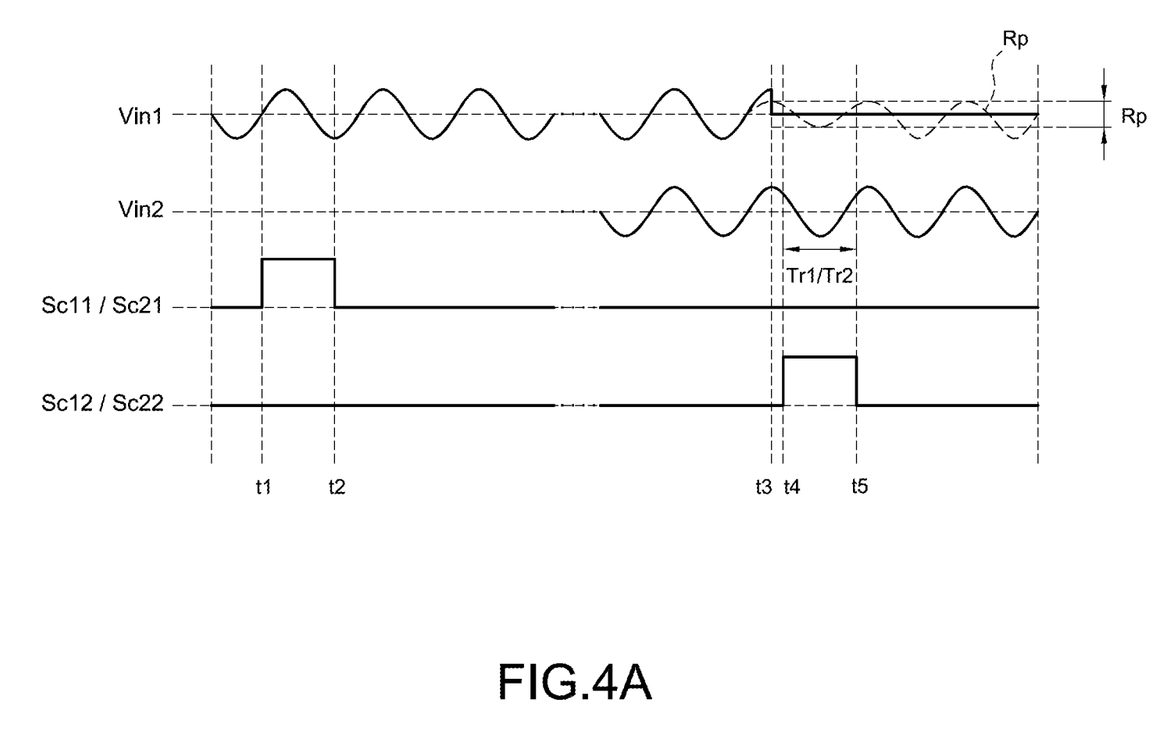
FIG. 4A is a schematic waveform of the second embodiment of the power backup circuit, and the first switch and the second switch thereof are magnetic latching relays according to the present disclosure.

Please refer to FIG. 4A, which shows a schematic waveform of the second embodiment of the power backup circuit, wherein the first switch and the second switch thereof are magnetic latching relays according to the present disclosure, and also refer to FIG. 1 to FIG. 3. As shown in FIG. 4A, the difference between the waveform of the power backup circuit 100' and the waveform of the power backup circuit 100 is that FIG. 4A does not contain the control signals of current limit unit 224/244 and control signals of bypass switches 222/242, and the rest controls are the same as in FIG. 2A.

Figure 4B:
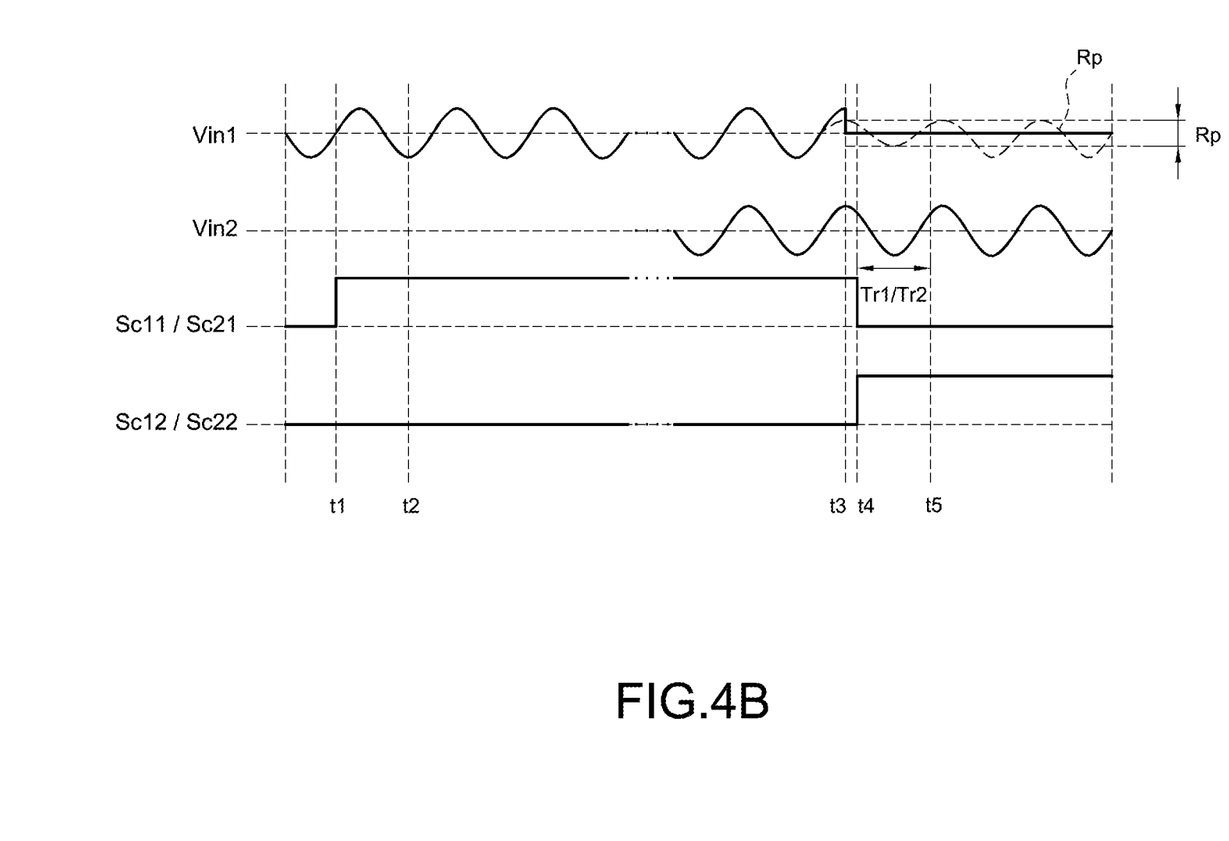
FIG. 4B is a schematic waveform of the second embodiment of the power backup circuit, and the first switch and the second switch thereof are not magnetic latching relays according to the present disclosure.

Please refer to FIG. 4B, which shows a schematic waveform of the second embodiment of the power backup circuit, wherein the first switch and the second switch thereof are not magnetic latching relays according to the present disclosure, and also refer to FIG. 1 to FIG. 4A. The first switch 12 and the second switch 14 are not magnetic latching relays, and the control manner is similar to FIG. 2B, and the control manners not mentioned are the same as those in FIG. 4A.

Figure 5:
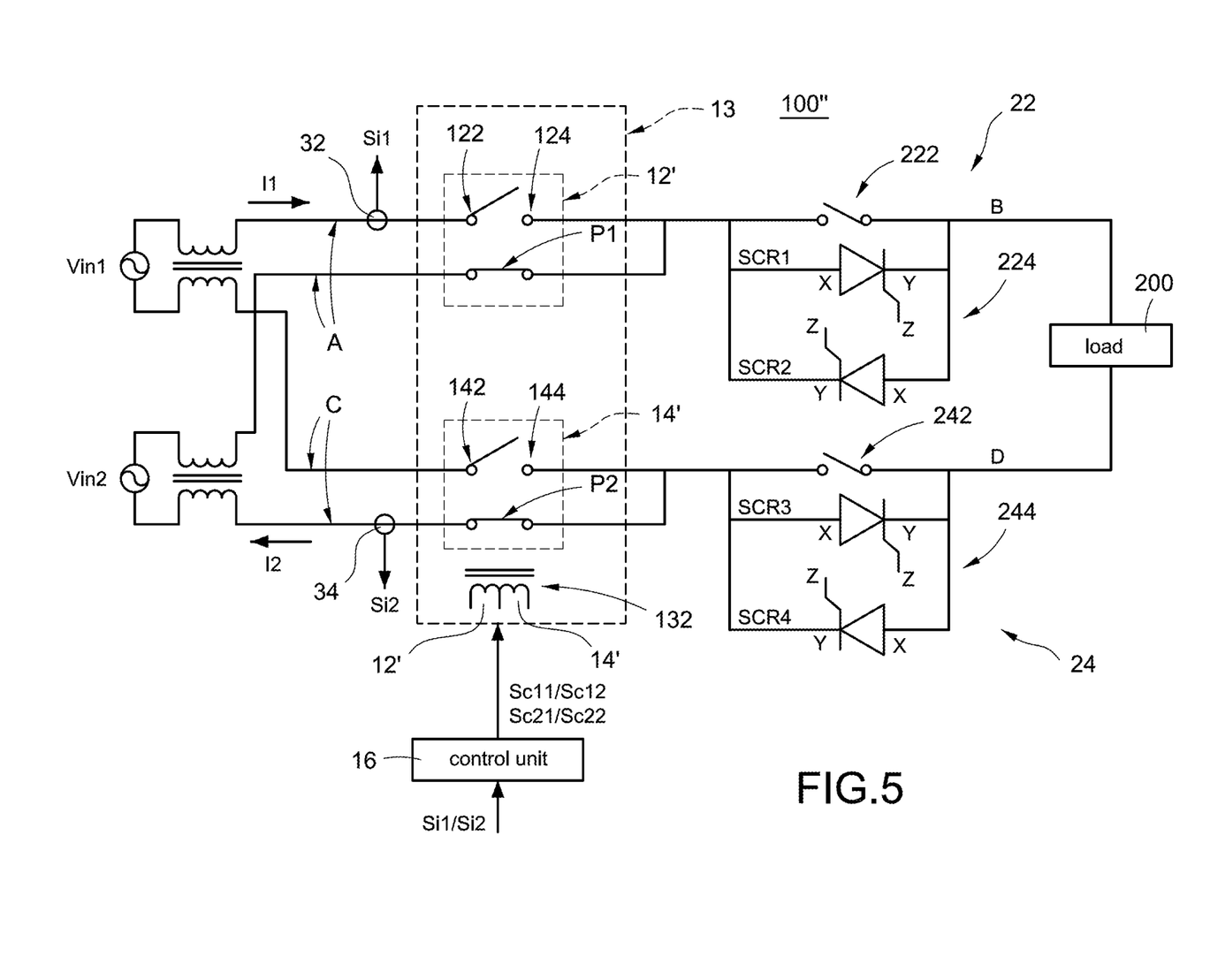
FIG. 5 is a block diagram of the power backup circuit according to a third embodiment of the present disclosure.

Please refer to FIG. 5, which shows a block diagram of the power backup circuit according to a third embodiment of the present disclosure, and also refer to FIG. 1 to FIG. 4B. The difference between the power backup circuit 100" shown in FIG. 5 and the power backup circuit 100 shown in FIG. 1 is that the first switch 12' and the second switch 14' of the power backup circuit 100" are integrated into a single switch module 13. The first switch 12' has a plurality of second ends 124 corresponding to the number of first ends 122, and the second switch 14' has a plurality of fourth ends 144 corresponding to the number of third ends 142. The switch module 13 further includes a control coil 132 which may be a center-tapped coil or a single coil. When the control coil 132 is excited, only one first end 122 of the first switch 12' is correspondingly coupled to the second end 124 (the same for the second switch 14'). In particular, the components and the coupling relationship of the components not mentioned in FIG. 5 are the same as those in FIG. 1, and the control manners are the same in FIG. 2A or FIG. 2B.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power backup circuit configured to provide a plurality of input power sources to back up a load, wherein the input power sources at least comprise a first input power source and a second input power source, the power backup circuit comprising:

a first switch comprising a plurality of first ends and a second end; the first ends respectively coupled to first nodes of the input power sources, the second end coupled to one end of the load, and a first power supply path formed by coupling one of the first ends to the second end, a second switch comprising a plurality of third ends and a fourth end; the third ends respectively coupled to second nodes of the input power sources, the fourth end coupled to an other end of the load, and a second power supply path formed by coupling one of the third ends to the fourth end, a control unit coupled to the first switch and the second switch, and a plurality of current sensors respectively coupled to the input power sources and the control unit, wherein when the input power source of the load is determined to be changed from the first input power source to the second input power source, the control unit reduces a supply current flowing through the first power supply path and the second power supply path to be below a current threshold, and then the control unit controls the second end of the first switch to be coupled to the first end corresponding to the second input power source, and controls the fourth end of the second switch to be coupled to the third end corresponding to the second input power source, and wherein the current sensors only provide a first current signal corresponding to a live wire end of the first input source and a second current signal corresponding to a neutral wire end of the second input source at once; or the current sensors only provide the first current signal corresponding to a neutral wire end of the first input source and the second current signal corresponding to a live wire end of the second input source at once, and the control unit determines whether the first switch and the second switch normally operate through the first current signal and the second current signal before and after the switching of the first switch and the second switch every time.

2. The power backup circuit in claim 1, wherein when the second end of the first switch is coupled to the first end corresponding to the second input power source and the fourth end of the second switch is coupled to the third end corresponding to the second input power source, the control unit removes a limitation that the supply current is less than the current threshold.

3. The power backup circuit in claim 1, further comprising:
   a first bypass unit comprising:
      a first bypass switch coupled to the second end of the first switch and one end of the load, and
      a first current limit unit coupled in parallel to the first bypass switch, and
   a second bypass unit comprising:
      a second bypass switch coupled to the fourth end of the second switch and the other end of the load, and
      a second current limit unit coupled in parallel to the second bypass switch.

4. The power backup circuit in claim 3, wherein when the input power source of the load is determined to be changed from the first input power source to the second input power source, an operation sequence of the first switch, the first bypass switch, and the first current limit unit is: the second end of the first switch is coupled to the first end corresponding to the second input power source, the first current limit unit is turned on, and the first bypass switch is turned on; an operation sequence of the second switch, the second bypass switch, and the second current limit unit is: the fourth end of the second switch is coupled to the third end corresponding to the second input power source, the second current limit unit is turned on, and the second bypass switch is turned on.

5. The power backup circuit in claim 4, wherein when the first bypass switch is turned on and the second bypass switch is turned on, the control unit removes a limitation that the supply current is less than the current threshold.

6. The power backup circuit in claim 3, wherein when the input power source of the load is determined to be changed from the first input power source to the second input power source, an operation sequence of the first switch, the first bypass switch, and the first current limit unit is: the first power supply path is disconnected, and the first current limit unit and the first bypass switch are simultaneously turned off; an operation sequence of the second switch, the second bypass switch, and the second current limit unit is: the second power supply path is disconnected, and the second current limit unit and the second bypass switch are simultaneously turned off.

7. The power backup circuit in claim 3, wherein
the first current limit unit comprises:
   a first silicon-controlled rectifier having an anode and a cathode; the anode coupled to the second end and the cathode coupled to one end of the load, and
   a second silicon-controlled rectifier having an anode and a cathode; the anode of the second silicon-controlled rectifier coupled to the cathode of the first silicon-controlled rectifier and the cathode of the second silicon-controlled rectifier coupled to the anode of the first silicon-controlled rectifier,
the second current limit unit comprises:
   a third silicon-controlled rectifier having an anode and a cathode; the anode of the third silicon-controlled rectifier coupled to the fourth end and the cathode of the third silicon-controlled rectifier coupled to the other end of the load, and
   a fourth silicon-controlled rectifier having an anode and a cathode; the anode of the fourth silicon-controlled rectifier coupled to the cathode of the third silicon-controlled rectifier and the cathode of the fourth silicon-controlled rectifier coupled to the anode of the third silicon-controlled rectifier.

8. The power backup circuit in claim 1, wherein the first switch and the second switch are magnetic latching relays; the control unit is configured to provide a first control signal to control the second end of the first switch to be coupled to the first end corresponding to the second input power source, and provide a second control signal to control the fourth end of the second switch to be coupled to the third end corresponding to the second input power source; wherein the first control signal and the second control signal are pulse signals.

9. The power backup circuit in claim 1, wherein a first switching time period is defined between a time point that the first end corresponding to the first input power source is disconnected from the second end and a time point that the first end corresponding to the second input power source is connected to the second end, and a second switching time period is defined between a time point that the third end corresponding to the first input power source is disconnected from the fourth end and a time point that the third end corresponding to the second input power source is connected to the fourth end; the first switching time period and the second switching time period are approximately equal to a mechanical delay time of switching the first switch and the second switch.

10. A method of operating a power backup circuit configured to provide a plurality of input power sources having at least a first input power source and a second input power source to back up a load, the method comprising steps of:
   controlling one of a plurality of first ends of a first switch to be coupled to one end of the first input power source so that a first power supply path is formed by the first end and a second end of the first switch for supplying power to one end of the load,
   controlling one of a plurality of third ends of a second switch to be coupled to the other end of the first input power source so that a second power supply path is formed by the third end and a fourth end of the second switch for supplying power to the other end of the load, reducing a supply current flowing through the first power supply path and the second power supply path to be below a current threshold when the input power source of the load is determined to be changed from the first input power source to the second input power source, controlling the second end of the first switch to be coupled to the first end corresponding to the second input power source, controlling the fourth end of the second switch to be coupled to the third end corresponding to the second input power source, only detecting a live wire current of the first input power source to provide a first current signal and detecting a neutral wire current of the second input power source to provide a second current signal at once, or only detecting neutral wire current of the first input power source to provide the first current signal and live wire current of the second input power source to provide the second current signal at once, and determining whether the first switch and the second switch normally operate through the first current signal and the second current signal before and after the switching of the first switch and the second switch every time.

11. The method of operating the power backup circuit in claim 10, wherein when the second end of the first switch is coupled to the first end corresponding to the second input power source and the fourth end of the second switch is coupled to the third end corresponding to the second input power source, a limitation that the supply current is less than the current threshold is removed.

12. The method of operating the power backup circuit in claim 10, wherein the second end of the first switch is coupled to one end of the load through a first bypass switch, and a first current limit unit is coupled in parallel to the first bypass switch; the fourth end of the second switch is coupled to the other end of the load through a second bypass switch, and a second current limit unit is coupled in parallel to the second bypass switch;

when the input power source of the load is determined to be changed from the first input power source to the second input power source, an operation sequence of the first switch, the first bypass switch, and the first current limit unit is: the second end of the first switch is coupled to the first end corresponding to the second input power source, the first current limit unit is turned on, and the first bypass switch is turned on; an operation sequence of the second switch, the second bypass switch, and the second current limit unit is: the fourth end of the second switch is coupled to the third end corresponding to the second input power source, the second current limit unit is turned on, and the second bypass switch is turned on.

13. The method of operating the power backup circuit in claim 12, wherein when the first bypass switch is turned on and the second bypass switch is turned on, a limitation that the supply current is less than the current threshold is removed.

14. The method of operating the power backup circuit in claim 12, wherein when the input power source of the load is determined to be changed from the first input power source to the second input power source, an operation sequence of the first switch, the first bypass switch, and the first current limit unit is: the first power supply path is disconnected, and the first current limit unit and the first bypass switch are simultaneously turned off; an operation sequence of the second switch, the second bypass switch, and the second current limit unit is: the second power supply path is disconnected, and the second current limit unit and the second bypass switch are simultaneously turned off.

15. The method of operating the power backup circuit in claim 10, wherein the first switch is excited by a first control signal so that the second end of the first switch is coupled to the first end corresponding to the second input power source, and the second switch is excited by a second control signal so that the fourth end of the second switch is coupled to the third end corresponding to the second input power source; the first control signal and the second control signal are pulse signals.

16. The method of operating the power backup circuit in claim 10, wherein a first switching time period is defined between a time point that the first end corresponding to the first input power source is disconnected from the second end and a time point that the first end corresponding to the second input power source is connected to the second end, and a second switching time period is defined between a time point that the third end corresponding to the first input power source is disconnected from the fourth end and a time point that the third end corresponding to the second input power source is connected to the fourth end; the first switching time period and the second switching time period are approximately equal to a mechanical delay time of switching the first switch and the second switch.

\* \* \* \* \*